May 2, 1950          M. SCHUMACHER          2,505,917

KITCHEN TOOL

Original Filed Feb. 15, 1936

INVENTOR.
Madeleine Schumacher
BY Edward E. Paret
ATTORNEYS.

Patented May 2, 1950

2,505,917

UNITED STATES PATENT OFFICE 2,505,917

KITCHEN TOOL

Madeleine Schumacher, Seattle, Wash.

Substituted for abandoned application Serial No. 64,133, filed February 15, 1936. This application filed March 16, 1945, Serial No. 583,014

3 Claims. (Cl. 30—24)

This invention relates to new and useful improvements in devices for preparing halved citrus fruits—as grapefruit and oranges—for table use or in the preparation of cocktails, salads, and the like. The present application is a substitute for abandoned application directed to like subject matter filed February 15, 1936, Ser. No. 64,133.

As its general object, the invention aims to provide a kitchen tool for the described purpose which enables the fruit to be easily and quickly prepared without mutilation of the appearance, and with the least possible loss of juice from the individual carpels which, in the use of the tool, are separated from the radial membranes lying between the carpel segments.

This general object, and other and more particular objects and advantages, will appear and be understood in the course of the following description and claims, the invention consisting in the novel construction, adaptation and combination of parts hereinafter described and claimed.

Figure 1:
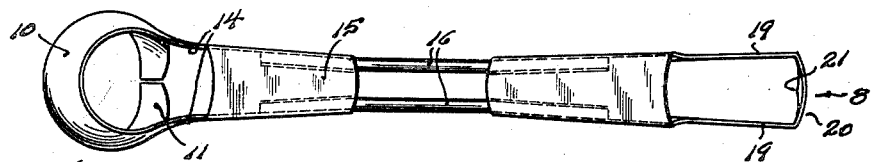
Figure 1 is a top plan view portraying a kitchen tool constructed in accordance with the now preferred embodiment of the invention.
Figure 2:
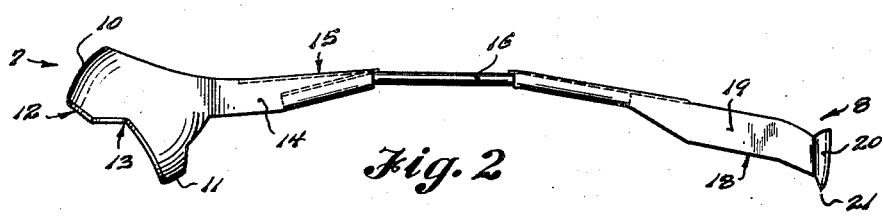
Fig. 2 is a side elevational view.
Figure 3:
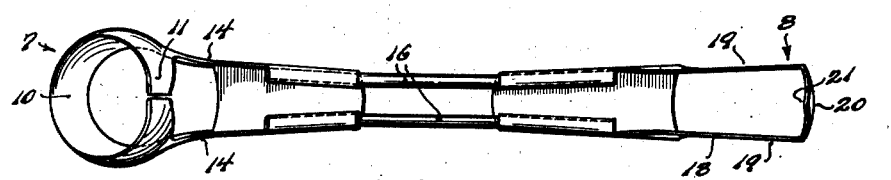
Fig. 3 is an underside plan view thereof.

The invention provides two co-active knives, designated generally by the numerals 7 and 8, and which are employed one to extract the core of the fruit and the other to separate the carpels from the rind and from the radial membranes. To simplify the description, these two knives will be independently considered.

First describing the core-removing knife 7, there is provided a hollow head portion of a relative truncated semi-spherical form. More especially, the configuration when viewed in side elevation is in the nature of a spherical ungula, and this is to say that, generally considered, the two planes occupied by the top and bottom edges of the figure desirably lie oblique to one another. The lune plane of this ungular figure lies uppermost and the other plane, which in the instance of a spherical ungula would perforce be a diameter of the sphere, lies lowermost. The edge of my hollow head which occupies this lower said plane is the cutting edge of the head. In producing this cutting edge, only the frontal part thereof occupies the diameter of the sphere and—considering the head in side elevation—extends rearwardly for, say, about one-third the head's fore-and-aft span. The heel limit occupies a plane more or less corresponding to this plane of the frontal cutting edge, and between said heel limit and said frontal section the cutting edge is brought upwardly as a re-entrant V. 12 and 13 denote the frontal and the reentrant-V cutting sections, respectively. At the back of the figure there is provided a vertical slit which, dividing the head at its rear into separated wings 11, permits a certain measure of "give" or spring action and enables the head to expand slightly upon contact with a seed, thus clearing rather than cutting the seed.

From the upper part of the head shank elements 14 are carried rearwardly and upwardly from each side, more or less following the plane of the figure's top edge and such as will place the shank elements at an angle of approximately 45° to the axis of the figure, and these shank elements are joined by a flat surface-shelf 15 running from the top edge of one to the top edge of the other. The shelf, in addition to its shank-stabilizing office, serves as a thumb-rest for the operator. The said shank elements are indicated as being rolled inwardly from the bottom edges to produce sockets accommodating parallel strands of wire 16, and these wires produce a handle and connect the head 7 with the other or carpel-cutting head 8.

In respect of this head 8, and which acts to cut the carpels along the outer and lateral limits of the segments, it will be seen that the design of the head is in the nature of a U-shape. The end wall of this U is denoted 20, and the side walls by 19, and there is provided a cutting edge 18 along the lower verge thereof.

The spacing as between said side walls approximates the width of the fruit carpels and, by preference, the arms producing these side walls tend to diverge upwardly—considered in transverse section—in order that the upper or following edges will project slightly beyond the lower or cutting edge, thereby precluding the fruit segment from being mashed as the tool is advanced in the performance of its cutting action. Considered in side elevation, the general plane of said arms 19 is at an inclination deflected slightly downwardly from the plane of the handle-forming wires 16, and as respects the cutting edge of these arms the greater portion thereof lies in a rectilineal plane interrupted only as the said edge approaches the end wall of the U, being here given a slightly inclined downward offset.

In producing my end wall 20, I design the same such as will conform to the curvilinear inner surface of the fruit rind, and this is to say with the facing surface slightly bellied both in horizontal and vertical section. The arc of this face which appears when viewed in vertical section is, moreover, so placed that the chord thereof lies at an angle of approximately 120° to the general plane of the side arms 19. The lower and cutting edge of the end wall is prolonged downwardly as a V-nose 21 beyond the side walls 19, and the upper or following edge is arched upwardly and produces a relatively blunt heel which, in the use of the tool, performs a crushing action in respect of the pulpy residue of the carpels remaining on the rind and enables the juice thereof to be extracted after first removing the segments.

Figure 4:
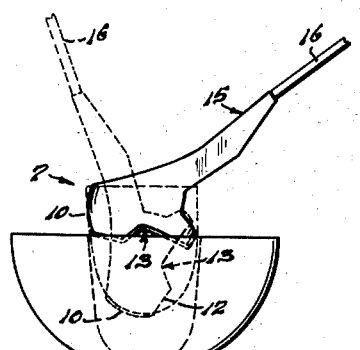
Fig. 4 is a fragmentary side elevational view showing the tool as it is applied to the fruit to remove the core from the latter preparatory to a separation of the pulpy carpel segments, the scale being reduced from that employed in Figs. 1 through 3, inclusive.

In applying the tool to the halved fruit, the head 7 is first used in the manner shown in Fig. 4, initially placing the head as it is portrayed by full lines and then pressing the knife edge downwardly while coincidently working the handle into its dotted-line position. An operator becomes quite adept at turning the head and manipulating the handle to accomplish an extremely clean cut, completely severing the core which may be then removed as a chunk simultaneously with the withdrawal of the head from the produced cavity.

Figure 5:
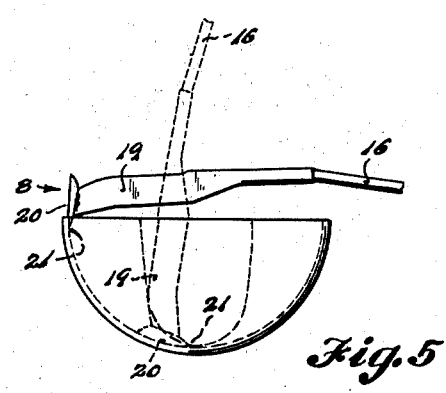
Fig. 5 is a view similar to Fig. 4 but here illustrating the tool as it is applied to cut the carpels from the rind and membranes.
Figure 6:
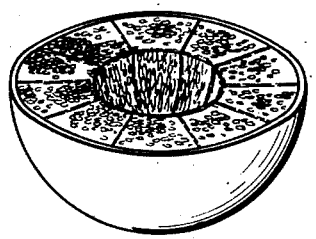
Fig. 6 is a perspective view indicating a halved grapfruit or orange, as the case may be, after the core has been removed and the carpels separated from the rind and membranes through use of the tool.

Following this coring action, the knife 8 is applied to the individual segments as portrayed in Fig. 5, the protruding lip 21 being first inserted by positioning the handle approximately horizontal, and then working the knife progressively from the indicated full-line to the dotted-line position. A slight rocking action about the longitudinal median line of the tool as an axis is advantageous in facilitating the cutting action of the edges. The heel of the end wall acts as an effective guide in preventing the cutting lip 21 from penetrating the rind, and this heel, as described, may be thereafter employed to retrace the path and remove remaining juice which, when the fruit is being prepared for table use, collects in the center cavity.

I intend that the design of the tool may be modified within the scope of the hereto annexed claims without departing from the spirit of the invention, it being self-evident that variations in detail may be resorted to without sacrifice of the inventive teachings.

What I claim is:

1. A kitchen tool for the purpose described comprising a handle having a pair of laterally-spaced shank elements extending angularly therefrom with a cutting head carried at the outer end of the shank elements, said cutting head being generally formed to a relative spherical ungula configuration providing a forward wall of greater depth than the rear wall and being open at the top and bottom with the shank elements extending rearwardly from opposite sides of the upper edge in a plane which lies in traversing relation to the ungular figure at an angle of approximately 45° to the axis of the latter, the lower edge of said cutting head being formed to a knife edge.

2. A kitchen tool for the purpose described comprising a cutting head and a handle therefor, said head being hollow and produced to the general form of a truncated hemisphere with the circumscribing wall having a greater depth at the front than at the rear, the lower edge of said head presenting a knife edge and, toward the front of the head and considered in side elevation, occupying a plane approximately coinciding with the diameter of the truncated hemispheric figure and, at the rear, being notched upwardly to present a re-entrant V.

3. The kitchen tool of claim 2 wherein the re-entrant V extends for approximately two-thirds the fore-and-aft length of the head.

MADELEINE SCHUMACHER.

REFERENCES CITED

The following references are of record in the file of this patent:

UNITED STATES PATENTS

| Number | Name | Date |
|---|---|---|
| 1,538,398 | Grainge | May 19, 1925 |
| 1,668,198 | Ferdon | May 1, 1928 |
| 2,167,898 | Lesponne | Aug. 1, 1939 |